United States Patent [19]
Nakamura et al.

[11] Patent Number: 5,508,831
[45] Date of Patent: Apr. 16, 1996

[54] LIQUID CRYSTAL DISPLAY PANEL WITH A COLOR LAYER HAVING AT LEAST TWO COLOR REGIONS WITHIN ONE PIXEL AND WITH A LIQUID CRYSTAL LAYER HAVING TWO PORTIONS OF DIFFERING BANDWIDTHS

[75] Inventors: Kimiaki Nakamura; Hidefumi Yoshida; Kazutaka Hanaoka; Hideaki Tsuda, all of Kawasaki, Japan

[73] Assignee: Fujitsu Limited, Kawasaki, Japan

[21] Appl. No.: 123,858

[22] Filed: Sep. 17, 1993

[30] Foreign Application Priority Data

Sep. 17, 1992 [JP] Japan ................................. 4-248022
Sep. 14, 1993 [JP] Japan ................................. 5-228882

[51] Int. Cl.$^6$ ........................... G02F 1/13; G02F 1/133; G02F 1/1335
[52] U.S. Cl. ........................... 359/51; 359/53; 359/68; 359/98
[58] Field of Search ........................... 359/51, 53, 68, 359/52, 66, 98

[56] References Cited

U.S. PATENT DOCUMENTS

| | | | |
|---|---|---|---|
| 4,610,507 | 9/1986 | Kamamori et al. | 359/53 |
| 4,877,309 | 10/1989 | Takamatsu | 359/68 |
| 4,886,343 | 12/1989 | Johnson | 359/53 |
| 4,953,953 | 9/1990 | Fergason | 359/53 |
| 5,194,973 | 3/1993 | Isogai et al. | 359/51 |
| 5,317,431 | 5/1994 | Yoshida et al. | 359/53 |

FOREIGN PATENT DOCUMENTS

| | | | |
|---|---|---|---|
| 3-198028 | 8/1991 | Japan . | |
| 4-284418 | 10/1992 | Japan | 359/62 |

*Primary Examiner*—Anita Pellman Gross
*Assistant Examiner*—Walter J. Malinowski
*Attorney, Agent, or Firm*—Staas & Halsey

[57] ABSTRACT

A liquid crystal display panel has a liquid crystal layer arranged between a pair of glass plates and a color filter arranged on one of the plates. The color filter has two color regions within one picture element. The liquid crystal layer has first and second liquid crystal layers, each of the layers containing dichroic dyes. Many different colors can be produced by selectively combining the colors of the color filter and the colors of the liquid crystal layers. The first and second liquid crystal layers are arranged in a substantially close relationship with each other thereby to omit any intermediately located glass plate between the first and second liquid crystal layers.

13 Claims, 12 Drawing Sheets

LIQUID CRYSTAL DISPLAY PANEL WITH A COLOR LAYER HAVING AT LEAST TWO COLOR REGIONS WITHIN ONE PIXEL AND WITH A LIQUID CRYSTAL LAYER HAVING TWO PORTIONS OF DIFFERING BANDWIDTHS

BACKGROUND OF THE INVENTION

1. Field of the Invention

The present invention relates to a liquid crystal display panel having two liquid crystal layers and a color layer and affording a multi-color display.

2. Description of the Related Art

U.S. Pat. No. 4,886,343 discloses a liquid crystal display device utilizing additive and subtractive color integrating techniques. In this prior art, the liquid crystal display device comprises two superposed liquid crystal display panels, and is used with a color filter to provide a multi-color display. The color filter has two color regions within one picture element, and a plurality of colors are presented by an additive color integration by selectively using one or both of the color regions. Also, each of the liquid crystal panels comprises a liquid crystal containing a dichroic dye having a particular color, and a plurality of colors are presented by a subtractive color integration by selectively using one or both of the colors of the two liquid crystal layers; for example, three colors, i.e., the color of dichroic dye in the first liquid crystal panel, the color of dichroic dye in the second liquid crystal panel, and the color of superposed liquid crystal panels, can be produced. In addition, further colors are produced by superposing the colors of the color filter and the color of the liquid crystal panels.

The liquid crystal panel typically comprises a pair of glass plates and a layer of liquid crystal inserted between the glass plates. When two liquid crystal display panels are used, the composite arrangement comprises a layer of liquid crystal inserted between a pair of glass plates and another layer of liquid crystal inserted between another pair of glass plates. However, in the arrangement including two superposed liquid crystal display panels, it is possible to omit one of the intermediately located glass plates. Thus, the liquid crystal display device of the above described prior art comprises a first outer glass plate (a color filter plate), an intermediately located glass plate, a second outer glass plate, a first layer of liquid crystal inserted between the color filter plate and the intermediately located glass plate, and a second layer of liquid crystal inserted between the intermediately located glass plate and the second outer glass plate.

In the liquid crystal display device including two superposed liquid crystal display panels, there is an intermediately located glass plate between two layers of liquid crystal. Generally, the thickness of the glass plate is considerably thicker than the thickness of the second layer of liquid crystal. Therefore, when a light is obliquely incident to the intermediately located glass plate and passes through the intermediately located glass plate, the position of the light emerging from the intermediately located glass plate is shifted laterally along the plate relative to the position of the light incident to the intermediately located glass plate. In addition, the areas of the picture elements are small, particularly in high definition display devices. Therefore, a problem arises in that when a light is obliquely incident to a certain picture element, the light may emerge from the adjacent picture element. The light may leak into the black display area and the contrast may be reduced.

SUMMARY OF THE INVENTION

The object of the present invention is to provide a liquid crystal display panel in which the contrast is high and the number of the realized colors is great.

According to the present invention, there is provided a liquid crystal display panel comprising: a pair of opposing plates; a liquid crystal layer arranged between the plates; a color layer arranged on one of the plates and having a first color region and a second color region within one picture element; the liquid crystal layer including, in at least one of the first and second color regions, a first liquid crystal portion capable of controlling the transmission of light within a first predetermined spectral bandwidth, and a second liquid crystal portion capable of controlling the transmission of light within a different, second spectral bandwidth from said first predetermined bandwidth; and the first and second liquid crystal portions being arranged substantially in a close relationship with each other within between said plates.

In this arrangement, the color layer may be one of a color filter or a reflecting film (for example, a dielectric film of a multi layered structure). When the color layer comprises the color filter, the color filter allows a light of a particular color having a predetermined bandwidth of spectrum to pass therethrough. When the color layer comprises the reflecting film, the reflecting film allows a light of a particular color having a predetermined spectral bandwidth to reflect thereat. The liquid crystal layer comprises the first and second liquid crystal portions capable of controlling the transmission of light within the respective spectral bandwidths. Accordingly, it is possible to produce various combination of colors, by additive and subtractive color integration, from the colors of the color layer and the colors of the liquid crystal portions. According to the present invention, the first and second liquid crystal portions are arranged substantially in a close relationship with each other within between the plates. That is, there is no intermediately located glass plate that may be provided in the prior art using two superposed liquid crystal display panels. Therefore, leakage of light can be reduced and the contrast increases.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
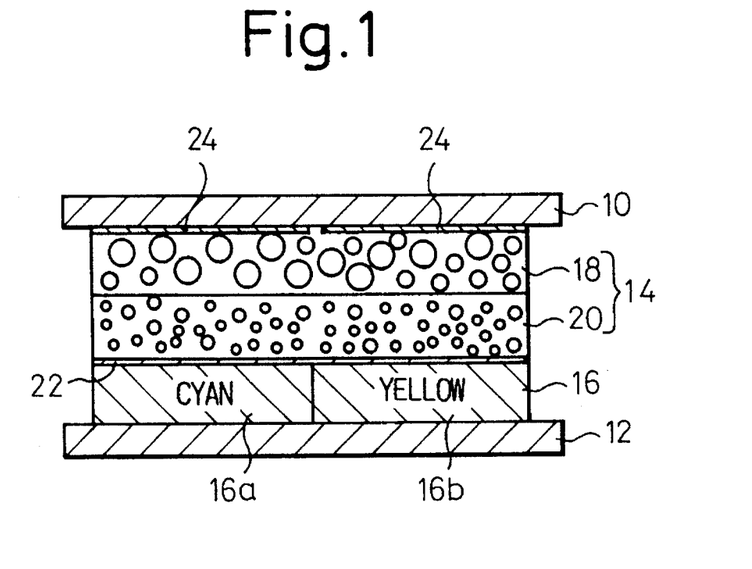
FIG. 1 is a cross-sectional view of the liquid crystal display panel according to the first embodiment of the present invention.

FIG. 1 shows the first embodiment of the present invention. The liquid crystal panel comprises a pair of glass plates 10 and 12, a layer of liquid crystal 14 and a color filter 16 arranged between the plates 10 and 12. FIG. 1 shows an area of one picture element, and the color filter 16 has a first color region 16a and a second color region 16b within one picture element. The transmission spectrum of the first color region 16a is different from that of the second color region 16b. For example, the first color region 16a comprises cyan, and the second color region 16b comprises yellow. Also, a common electrode 22 made of ITO is arranged on the color filter 16 on the second plate 12, and pixel electrodes 24 made of ITO are arranged on the first plate 10 corresponding to the color regions 16a and 16b.

The liquid crystal layer 14 comprises a first, upper liquid crystal layer 18 and a second, lower liquid crystal layer 20 separately stratified one above another without an intermediate glass plate therebetween. The first liquid crystal layer 18 comprises a polymer dispersed type liquid crystal in which droplets of liquid crystal are gathered as capsules and dispersed in a polymer material, and black or green dichroic dye is mixed in the liquid crystal. Similarly, the second liquid crystal layer 20 comprises a polymer dispersed type liquid crystal in which droplets of liquid crystal are gathered as capsules and dispersed in a polymer material, and magenta dichroic dye is mixed in the liquid crystal. The color of dichroic dyes determine the transmission spectrum of each of the liquid crystal layers 18 and 20.

The size of the droplets of liquid crystal of the first liquid crystal layer 18 is larger than that of the second liquid crystal layer 20. In the polymer dispersed type liquid crystal, it is known that the threshold voltage changes if the size of the droplets of liquid crystal changes. The threshold voltage of the first liquid crystal layer 18 is lower than that of the second liquid crystal layer 20.

Figure 2:
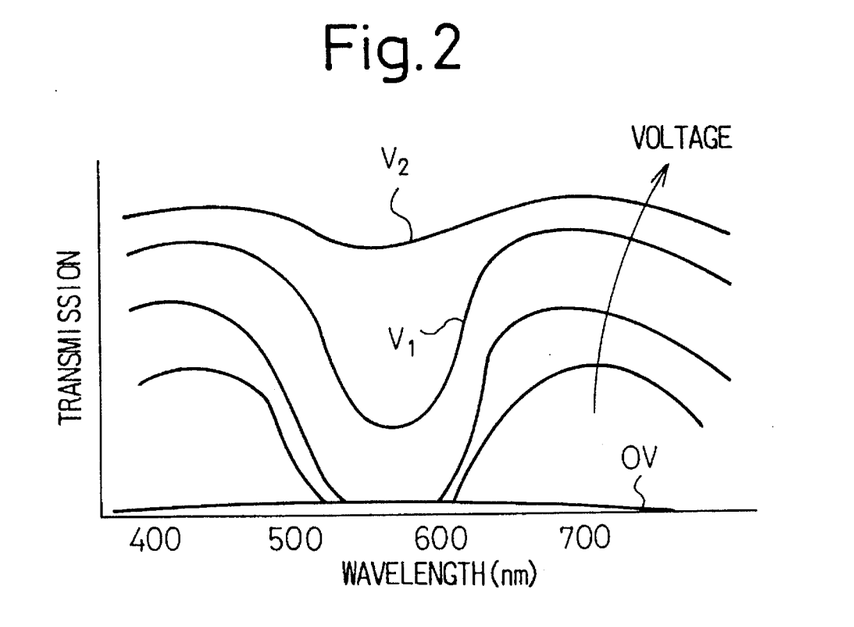
FIG. 2 is a view illustrating the transmission spectrum of the layer of liquid crystal of FIG. 1.

Therefore, when the voltage applied to the liquid crystal layer 14 is increased from 0 volts to a certain value, the transmission spectrum of the liquid crystal 14 changes in a manner as shown in FIG. 2. That is, when the voltage applied to the liquid crystal layer 14 is 0 volts, molecules in the droplets of liquid crystal of the first liquid crystal layer 18 are randomly aligned, so black dichroic dye is randomly aligned to absorb the incident light and produce a black display spot. In this case, the transmission of the light in the first liquid crystal layer 18 is substantially zero for the entire visible range of the spectrum.

When the applied voltage is higher than the threshold voltage of the first liquid crystal layer 18 and lower than the threshold voltage of the second liquid crystal layer 20 (for example, the voltage is $V_1$ in FIG. 2), molecules in the droplets of liquid crystal of the first liquid crystal layer 18 are aligned in the direction perpendicular to the plates 10 and 12, so the black dichroic dye is aligned in the same direction. Therefore, the incident light in the entire visible range transmits through the first liquid crystal layer 18 and the first liquid crystal layer 18 becomes transparent. In this case, molecules in the droplets of liquid crystal of the second liquid crystal layer 20 are randomly aligned, so magenta dichroic dye is ramdomly aligned and the color of magenta is visible. This voltage $V_1$ can be varied to change the brightness of magenta.

When the applied voltage is higher than the threshold voltage of the second liquid crystal layer 20 (for example, the voltage is $V_2$ in FIG. 2), molecules in the droplets of liquid crystal of the second liquid crystal layer 20 are aligned in the direction perpendicular to the plates 10 and 12, so the magenta dichroic dye is aligned in the same direction. Therefore, the incident light in the entire visible range transmits the second liquid crystal layer 20 which becomes transparent. Accordingly, the color regions 16a and 16b of the color filter 16 can be seen under the transparent liquid crystal layer 14. In this manner, it is possible to obtain many colors by the combination of the colors of the liquid crystal layer 14 and the colors of the different color regions 16a and 16b of the color filter 16, although one picture element is divided into only two portions.

The following table shows an example of the colors obtained in accordance with the controlled color condition in a cyan region of the liquid crystal layer 14 corresponding to the first color (cyan) region 16a, and the controlled color condition in a yellow region of the liquid crystal layer 14 corresponding to the second color (yellow) region 16b.

| COLORS | CYAN REGION | YELLOW REGION |
|---|---|---|
| BLACK | BLACK | BLACK |
| BLUE | MAGENTA | BLACK |
| RED | BLACK | MAGENTA |
| MAGENTA | MAGENTA | MAGENTA |
| GREEN | TRANSPARENT | TRANSPARENT |
| CYAN | TRANSPARENT | BLACK |
| YELLOW | BLACK | TRANSPARENT |
| WHITE | MAGENTA (50%) | MAGENTA (50%) |

FIGS. 3A to 3E show the manufacturing steps for manufacturing the liquid crystal display panel having the liquid crystal layer 14 comprising the first and second liquid crystal layers 18 and 20.

Figure 3A:
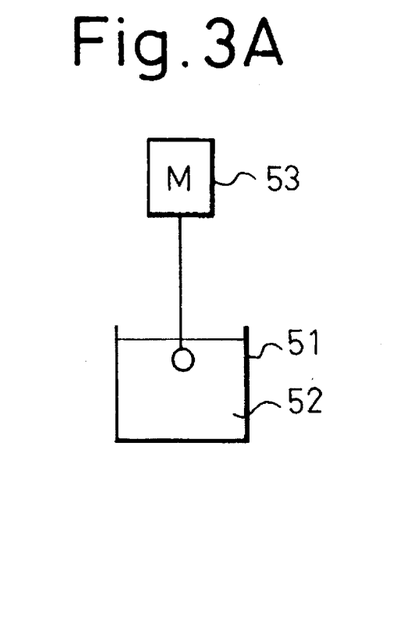
FIGS. 3A to 3E are views illustrating the manufacturing steps for manufacturing the liquid crystal display panel of FIG. 1.
Figure 3B:
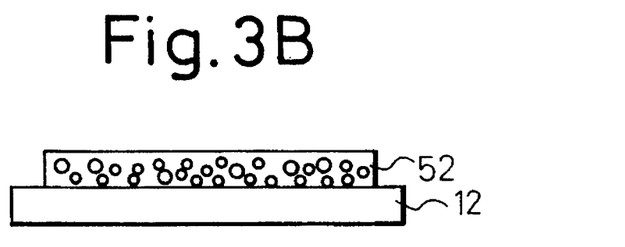
Figure 3C:
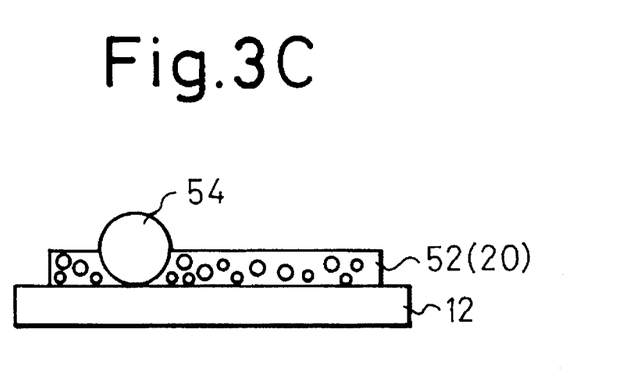

In FIG. 3A, polyvinyl alcohol and liquid crystal containing magenta dichroic dye therein are mixed in a container 51, and the mixture 52 is emulsified into a colloidal solution by a homogenizer 53. The mixture 52 is then applied to the second plate 12 by screen printing or the like, as shown in FIG. 3B. Spherical spacers 54 are scattered in the mixture 52 on the second plate 12, and then liquid component in the mixture 52 is evaporated, as shown in FIG. 3C. Therefore, the polyvinyl alcohol is hardened and molecules of the liquid crystal containing magenta dichroic dye therein are dispersed as droplets in the polyvinyl alcohol, resulting in the formation of the second liquid crystal layer 20.

Alternatively, it is possible to form the second liquid crystal layer 20, by applying a mixture including liquid crystal, a dichroic dye and an ultraviolet polymerizable prepolymer to the second plate 12, applying a plastic film such as PET film to the mixture to spread the mixture so that the mixture has a predetermined thickness, and irradiating an ultraviolet light onto the mixture from above the film. Molecules of the liquid crystal containing magenta dichroic dye therein are dispersed as droplets in the polymer and the second liquid crystal layer 20 is formed. Finally, the plastic film is removed from the second liquid crystal layer 20. In this case, it is preferable to use an anthraquinone dichroic dye or a cyan dichroic dye as a dichroic dye contained in the liquid crystal, so that the polymerization of the polymer advances well.

Figure 3D:
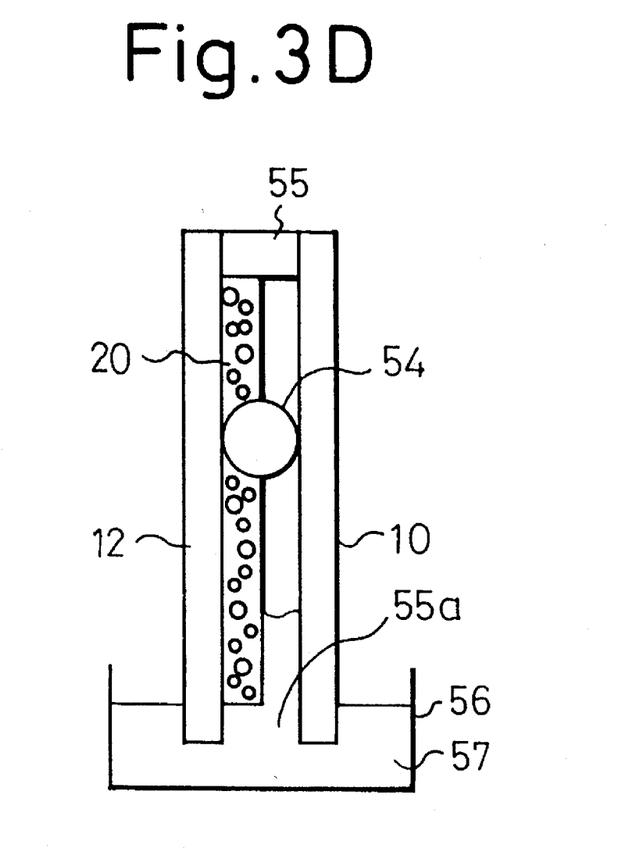
Figure 3E:
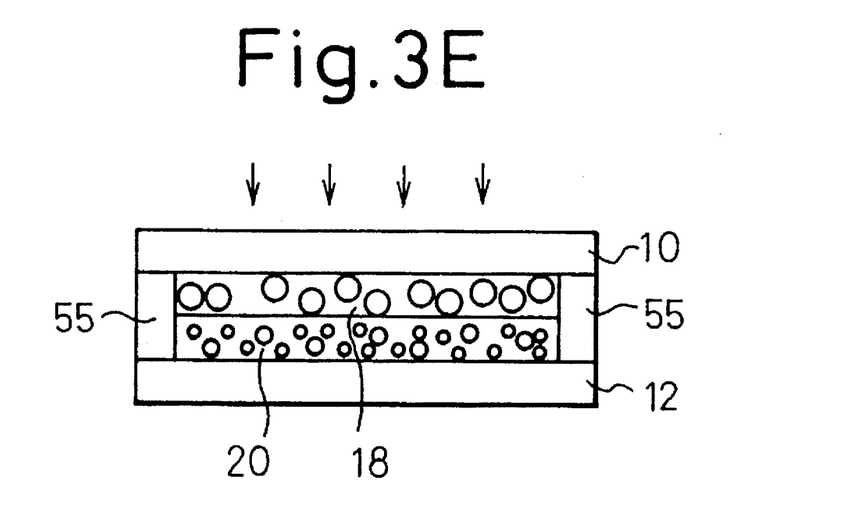

The first plate 10 is then adhered to the second plate 12 with an annular seal 55, as shown in FIG. 3D. The annular seal 55 has an inlet 55a through which the liquid crystal can be introduced. A further mixture 57 comprising a photocurable resin curable and a liquid crystal containing black dichroic dye is prepared in a container 56, and the mixture 57 is introduced into an internal space between the first and second plates 10 and 12 via the inlet 55a of the annular seal 55. It is known that the introduction of the mixture 57 is carried out in a vacuum chamber. Ultraviolet light is then irradiated onto the mixture 57, with the result that the photocurable resin is hardened and molecules of the liquid crystal containing black dichroic dye therein are dispersed as droplets in the resin to form the first liquid crystal layer 18, as shown in FIG. 3E.

As shown in FIGS. 1, 2, and 3A to 3E, the first and second liquid crystal layers 18 and 20 are arranged substantially in a close relationship with each other between the first and second plates 10 and 12. That is, the first and second liquid crystal layers 18 and 20 are separately stratified one above another without an intermediate glass plate therebetween. Therefore, when a light is obliquely incident to the first liquid crystal layer 18 and emerges from the second liquid crystal layer 20, the amount of the lateral shift of the light along the plates 10 and 12 from the position of the incident to the position of the emerging light is small. Therefore, the problem of leakage of light and the reduction of the contrast are solved.

Figure 4:
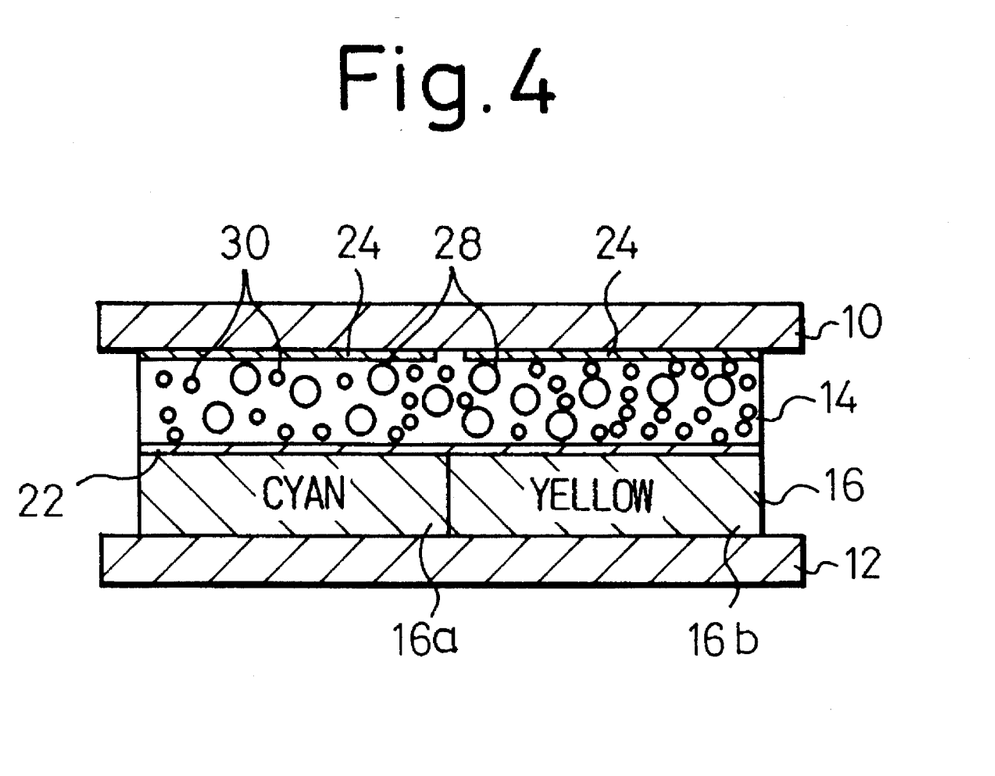
FIG. 4 is a cross-sectional view of the liquid crystal display panel according to the second embodiment of the present invention.

FIG. 4 shows the second embodiment of the present invention. The liquid crystal panel comprises a liquid crystal layer 14 and a color filter 16 arranged between a pair of glass plates 10 and 12. The color filter 16 has a first color region 16a and a second color region 16b within one picture element. The first color region 16a is cyan, and the second color region 16b is yellow. Also, a common electrode 22 is arranged on the color filter 16 on the second plate 12, and pixel electrodes 24 are arranged on the first plate 10 corresponding to the color regions 16a or 16b.

The liquid crystal layer 14 in FIG. 4 comprises a first liquid crystal portion 28 and a second liquid crystal portion 30 formed in a single liquid crystal layer, while the liquid crystal layer 14 in FIG. 1 comprises first and second stratified liquid crystal layers 18 and 20. That is, the liquid crystal layer 14 comprises a polymer dispersed type liquid crystal which includes a first liquid crystal portion 28 having droplets of liquid crystal with a large size and black dichroic dye contained therein and a second liquid crystal portion 30 having droplets of liquid crystal with a small size and magenta dichroic dye contained therein. Therefore, in this case too, the threshold voltage of the first liquid crystal portion 28 is different from that of the second liquid crystal layer 20, and it is possible to obtain many colors, as described above.

Figure 5A:
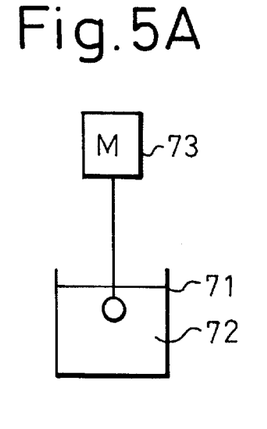
FIGS. 5A to 5E are views illustrating the manufacturing steps for manufacturing the liquid crystal display panel of FIG. 4.
Figure 5B:
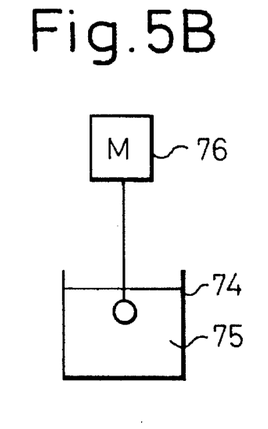
Figure 5C:
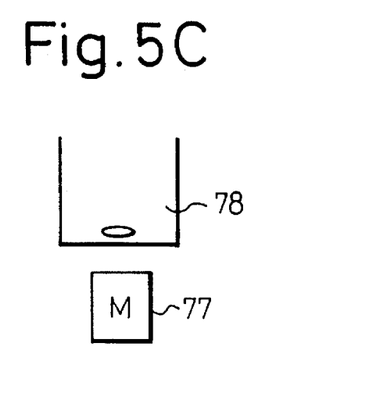
Figure 5D:
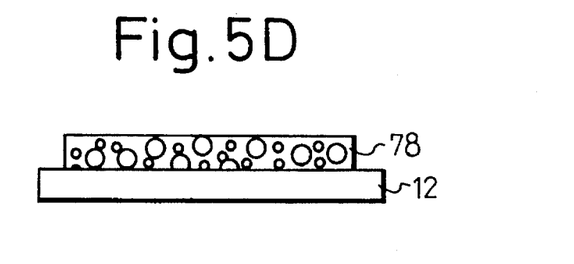
Figure 5E:
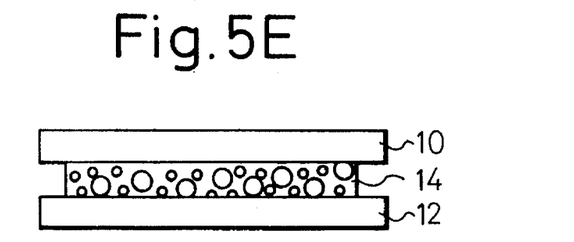

FIGS. 5A to 5E show the manufacturing steps for manufacturing the liquid crystal display panel of FIG. 4. In FIG. 5A, polyvinyl alcohol and liquid crystal containing magenta dichroic dye therein are mixed in a container 71, and the mixture 72 is emulsified by a homogenizer 73. In FIG. 5B, polyvinyl alcohol and liquid crystal containing magenta dichroic dye therein are mixed in a container 74, and the mixture 75 is emulsified by a homogenizer 76. To change the size of the droplets of liquid crystal between the first and second liquid crystal portions 28 and 30, the homogenizing condition in the step of FIG. 5A is changed relative to the homogenizing condition in the step of FIG. 5B. In FIG. 5C, the mixture 72 and the mixture 75 are then mixed to form a mixture 78, by a stirrer 77. In FIG. 5D, the mixture 78 is then applied to the second plate 12 by screen printing or the like, and liquid component in the mixture 78 is evaporated. Therefore, polyvinyl alcohol is hardened and molecules of the liquid crystal containing magenta dichroic dye and black dichroic dye, respectively, are dispersed as droplets in polyvinyl alcohol, resulting in the formation of the liquid crystal layer 14. In FIG. 5E, the first plate 10 is then adhered to the second plate 12. It will be noted that spherical spacers and the annular seals of FIGS. 3C and 3D can be appropriately used in this embodiment.

Figure 6:
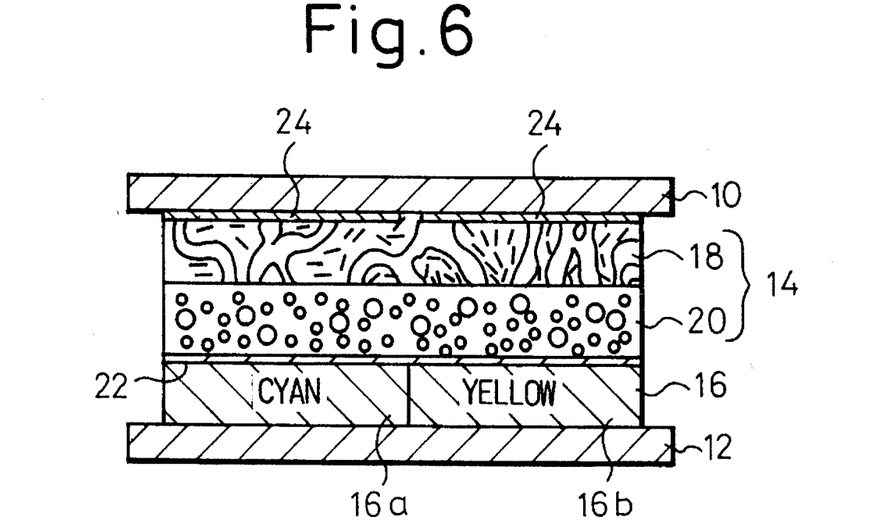
FIG. 6 is a cross-sectional view of the liquid crystal display panel according to the third embodiment of the present invention.

FIG. 6 shows the third embodiment of the present invention. The liquid crystal panel comprises a liquid crystal layer 14 and a color filter 16 arranged between a pair of glass plates 10 and 12. The color filter 16 has a first color region 16a and a second color region 16b within one picture element. The first color region 16a includes cyan dye, and the second color region 16b includes yellow dye. A common electrode 22 is arranged on the color filter 16 on the second plate 12, and pixel electrodes 24 are arranged on the first plate 10 corresponding to the color regions 16a or 16b.

The liquid crystal layer 14 comprises first and second stratified liquid crystal layers 18 and 20, similarly to the embodiment of FIG. 1. In this embodiment, the second liquid crystal layer 20 comprises a polymer dispersed type liquid crystal containing magenta dichroic dye, but the first liquid crystal layer 18 comprises a polymer liquid crystal having a three dimensional network structure and black dichroic dye contained in the network. The liquid crystal display panel having the liquid crystal layer 14 including the polymer liquid crystal having a three dimensional network structure can be manufactured in a process similar to steps 3D and 3E, by changing the manufacturing conditions. In this case too, it is possible to obtain many colors, as described above.

Figure 7:
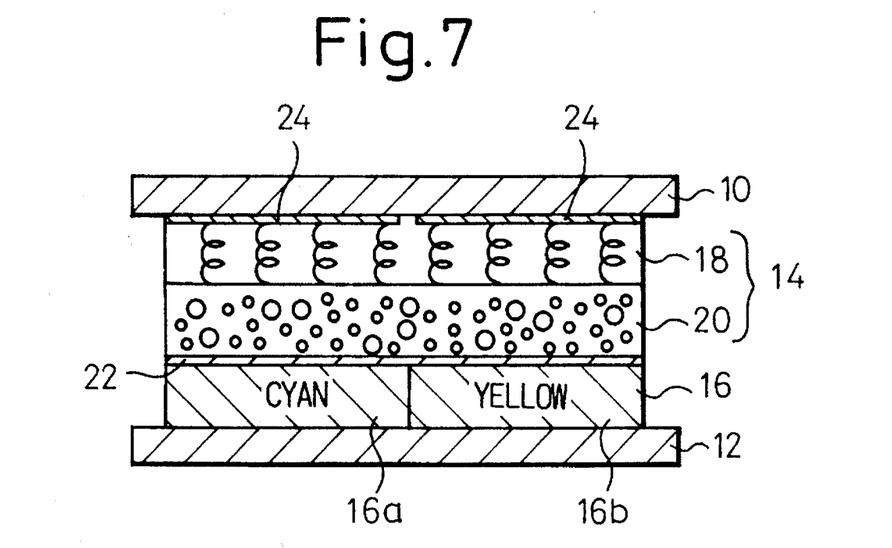
FIG. 7 is a cross-sectional view of the liquid crystal display panel according to the fourth embodiment of the present invention.

FIG. 7 shows the fourth embodiment of the present invention. The liquid crystal panel comprises a liquid crystal layer 14 and a color filter 16 arranged between a pair of glass plates 10 and 12. The color filter 16 has a first color region 16a and a second color region 16b within one picture element. The first color region 16a includes cyan dye, and the second color region 16b includes yellow dye. The layer of liquid crystal 14 comprises first and second stratified liquid crystal layers 18 and 20. In this embodiment, the second liquid crystal layer 20 comprises a polymer dispersed type liquid crystal containing magenta dichroic dye, but the first liquid crystal layer 18 comprises a phase change type liquid crystal having black dichroic dye contained therein. In this case too, it is possible to obtain a multi-color display, as described above.

As described above, according to the present invention, it is possible to obtain the liquid crystal layer 14 comprising the first liquid crystal portion having a first dichroic dye contained therein and the second liquid crystal portion having a second dichroic dye contained therein. Also, in order to differentiate the threshold voltage of the first liquid crystal portion from that of the second liquid crystal portion, it is possible not only to differentiate the size of the droplets of liquid crystal but also to change other parameters such as dielectric constant, elastic modulus, and viscosity of liquid crystal. In the embodiment, the first color region 16a is cyan, the second color region is yellow, and the liquid crystal layer 14 is magenta (and black or green). However, it is also possible to arrange the colors of the color filter 16 and the colors of the liquid crystal layer 14 in a different manner; for example, so that the first color region 16a is cyan, the second color region is magenta, and the liquid crystal layer 14 is yellow (and black or blue); or, the first color region 16a is magenta, the second color region is yellow, and the liquid crystal layer 14 is cyan (and black or red). It is also possible to use other means for the color layer than the color filter 14, such as a reflecting layer, as described previously.

Figure 8:
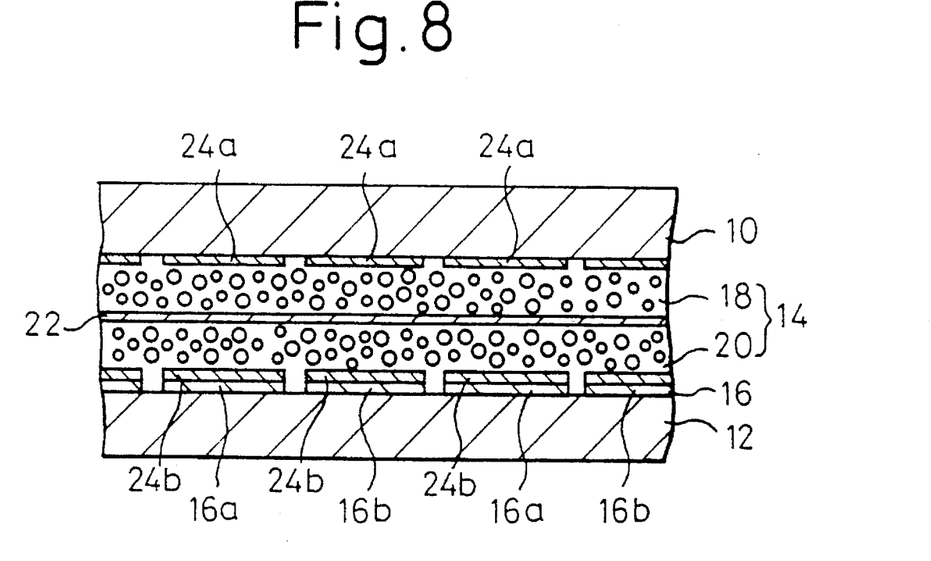
FIG. 8 is a cross-sectional view of the liquid crystal display panel according to the fifth embodiment of the present invention.

FIG. 8 shows the fifth embodiment of the present invention. The liquid crystal panel comprises a liquid crystal layer 14 and a color filter 16 arranged between a pair of glass plates 10 and 12. The color filter 16 has a first color region 16a and a second color region 16b within one picture element. The first color region 16a includes green dye, and the second color region 16b includes magenta dye. The liquid crystal layer 14 comprises first and second stratified liquid crystal layers 18 and 20, formed of polymer dispersed type liquid crystals, respectively. The first liquid crystal layer 18 includes blue dichroic dye, and the second liquid crystal layer 20 includes yellow dichroic dye. In this case, it is possible to arrange the liquid crystal portions 18 and 20 so that these portions have the color combination of red and cyan. Alternatively, the first and second color regions have the color combination of blue and yellow, and the first and second liquid crystal portions have the color combination of red and cyan or the color combination of green and magenta. Alternatively, the first and second color regions have the color combination of red and cyan, and the first and second liquid crystal portions have the color combination of green and magenta or the color combination of blue and yellow.

In FIG. 8, the common electrode 22 is arranged at a boundary between the first and second liquid crystal layers 18 and 20. The pixel electrodes 24a are arranged on the first, upper plate 10 and the further pixel electrodes 24b are arranged on the second, lower plate 12. Both pixel electrodes 24a and 24b are arranged corresponding to the color regions 16a and 16b, respectively. The common electrode 22 can be formed on the second liquid crystal layer 20 after the second liquid crystal layer 20 is hardened, as described with reference to FIGS. 3A to 3C. The pixel electrodes 24a and 24b can be initially formed on the respective plates 10 and 12.

In this arrangement, the first liquid crystal layer 18 is driven by the voltage between the common electrode 22 and the pixel electrodes 24a, and the second liquid crystal layer 20 is driven by the voltage between the common electrode 22 and the pixel electrodes 24b. Accordingly, it is not necessary to apply a high voltage ($V_2$ in FIG. 2) to both of the first and second liquid crystal layers 18 and 20, and it is possible to reduce the consumed power and to realize a multi-color display. This arrangement includes the common electrode 22 between the first and second liquid crystal layers 18 and 20, but the common electrode 22 made of ITO is very thin compared with the glass plate. Accordingly, it is possible to consider that the first and second liquid crystal layers 18 and 20 of this embodiment may be arranged substantially in a close relationship with each other within the plates 10 and 12. This feature can be applied to a case in which another liquid crystal than the polymer dispersed type liquid crystal is used.

Figure 9:
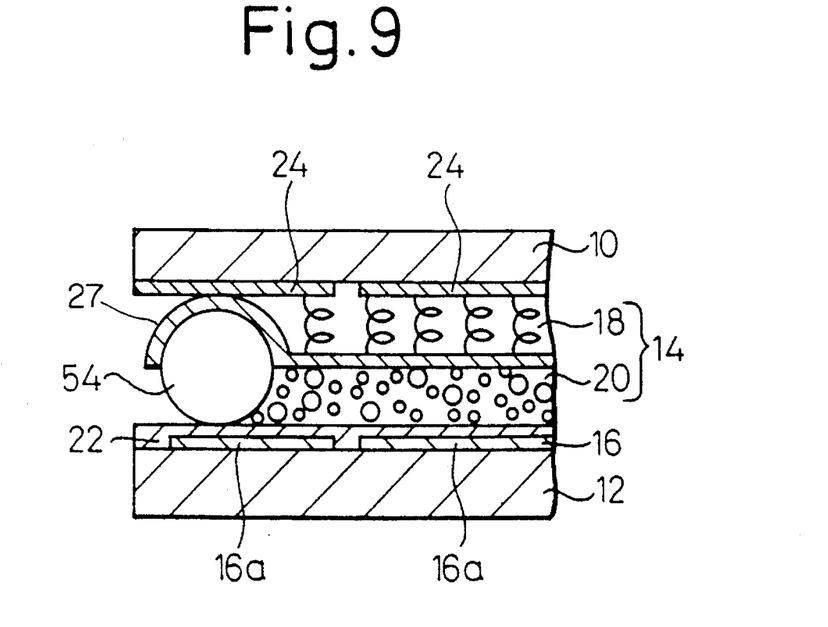
FIG. 9 is a cross-sectional view of the liquid crystal display panel according to the sixth embodiment of the present invention.

FIG. 9 shows the sixth embodiment of the present invention. The liquid crystal layer 14 comprises a first liquid crystal layer 18 comprising a phase change type liquid crystal and a second liquid crystal layer 20 comprising a polymer dispersed type liquid crystal. In this embodiment, a passivation film 27 such as a PVA film, a PVB film, or an acrylic film is arranged at a boundary between the first and second liquid crystal layers 18 and 20 to prevent the liquid crystal in one of the first and second liquid crystal layers 18 and 20 from displacing into the other layer. Preferably, the passivation film 27 is formed on the second liquid crystal layer 20 after the spherical spacers 54 are scattered on the second plate 12 and the second liquid crystal layer 20 is pressed. Therefore, the liquid crystal in one of the first and second liquid crystal layers 18 and 20 does not leak into the other layer.

Figure 10:
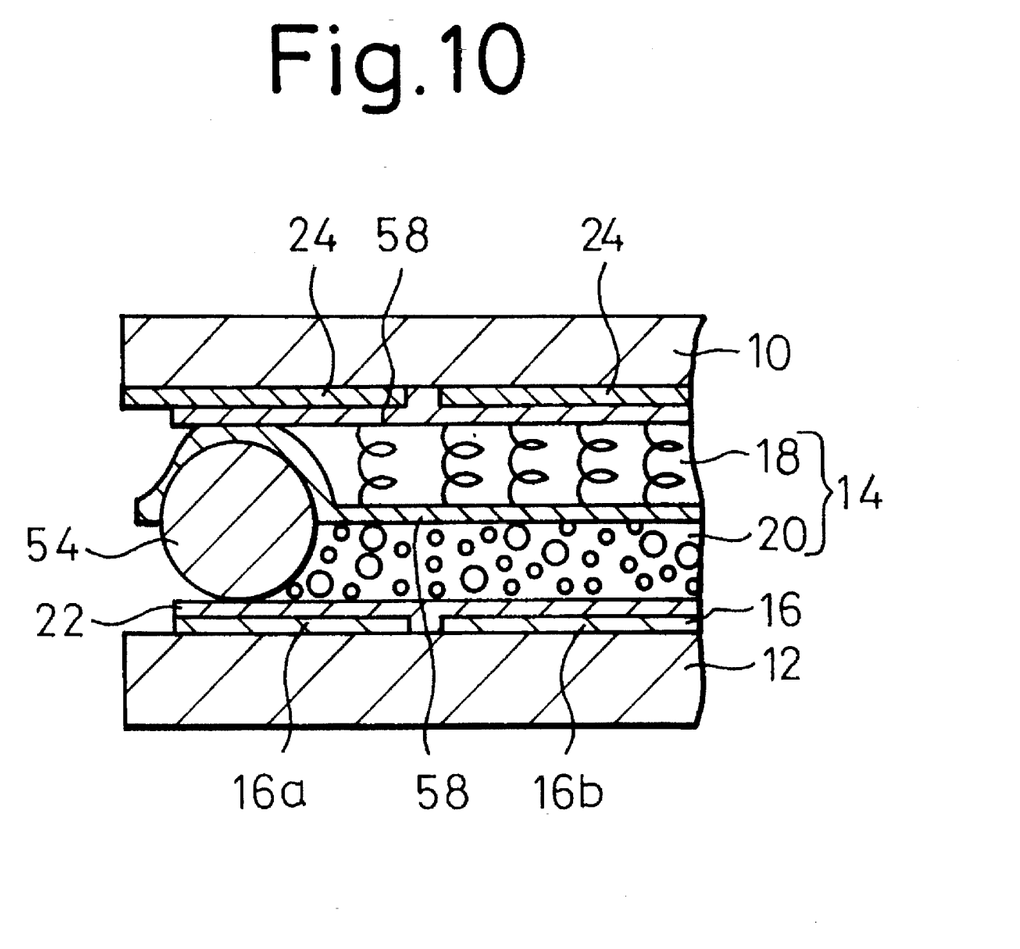
FIG. 10 is a cross-sectional view of the liquid crystal display panel according to the seventh embodiment of the present invention.

FIG. 10 shows the seventh embodiment of the present invention. The liquid crystal layer 14 comprises a first liquid crystal layer 18 comprising a phase change type liquid crystal and a second liquid crystal layer 20 comprising a polymer dispersed type liquid crystal. In this embodiment, perpendicular alignment layers 58 comprising polyimide, chromium complex, fluoric resin, or silane coupling agent and adapted to cause liquid crystals to align perpendicularly to the plates 10 and 12 are arranged on the first plate 10, and at a boundary between the first and second liquid crystal layers 18 and 20. In the phase change type liquid crystal, molecules of liquid crystal are in a twisted strap-like configuration when voltage is not applied, and rise or align perpendicularly to the plates 10 and 12 so that the incident light can transmit the liquid crystal when voltage is applied. The alignment layers 58 function to aid the liquid crystals to rise perpendicularly to the plates 10 and 12. Also, it is possible to add a perpendicular alignment material causing liquid crystals to align perpendicularly to the plates 10 and 12 into a material in the liquid crystal is dispersed. Also, it is possible to minimize a hysteresis characteristics in the electro-optical characteristics by using a guest-host liquid crystal having a homogeneous alignment, a twisted nematic alignment or an STN alignment as the phase change type liquid crystal. In this case, it is preferable to arrange so that the interface between the phase change type liquid crystal and the plate has a horizontal alignment property and the surface having the horizontal alignment property is treated by rubbing.

Figure 11:
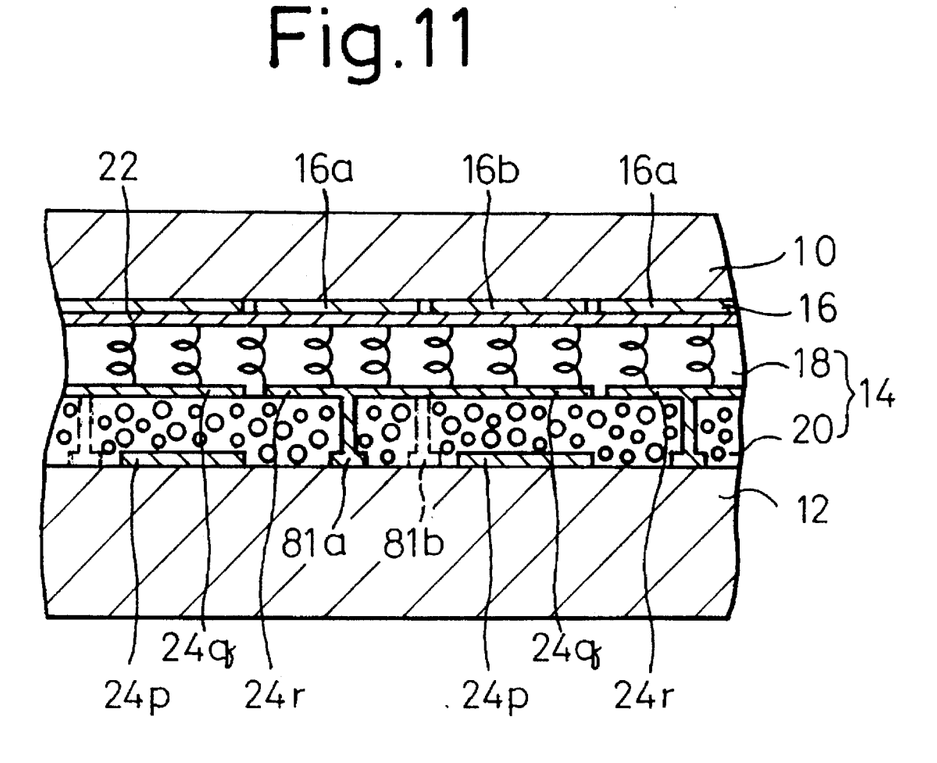
FIG. 11 is a cross-sectional view of the liquid crystal display panel according to the eighth embodiment of the present invention.

FIG. 11 shows the eighth embodiment of the present invention. The liquid crystal layer 14 comprises a first liquid crystal layer 18 comprising a phase change type liquid crystal and a second liquid crystal layer 20 comprising a polymer dispersed type liquid crystal. In this embodiment, the color filter 16 having first and second color regions 16a and 16b is arranged on the first plate 10, and the common electrode 22 is arranged on the color filter 22.

Figure 12:
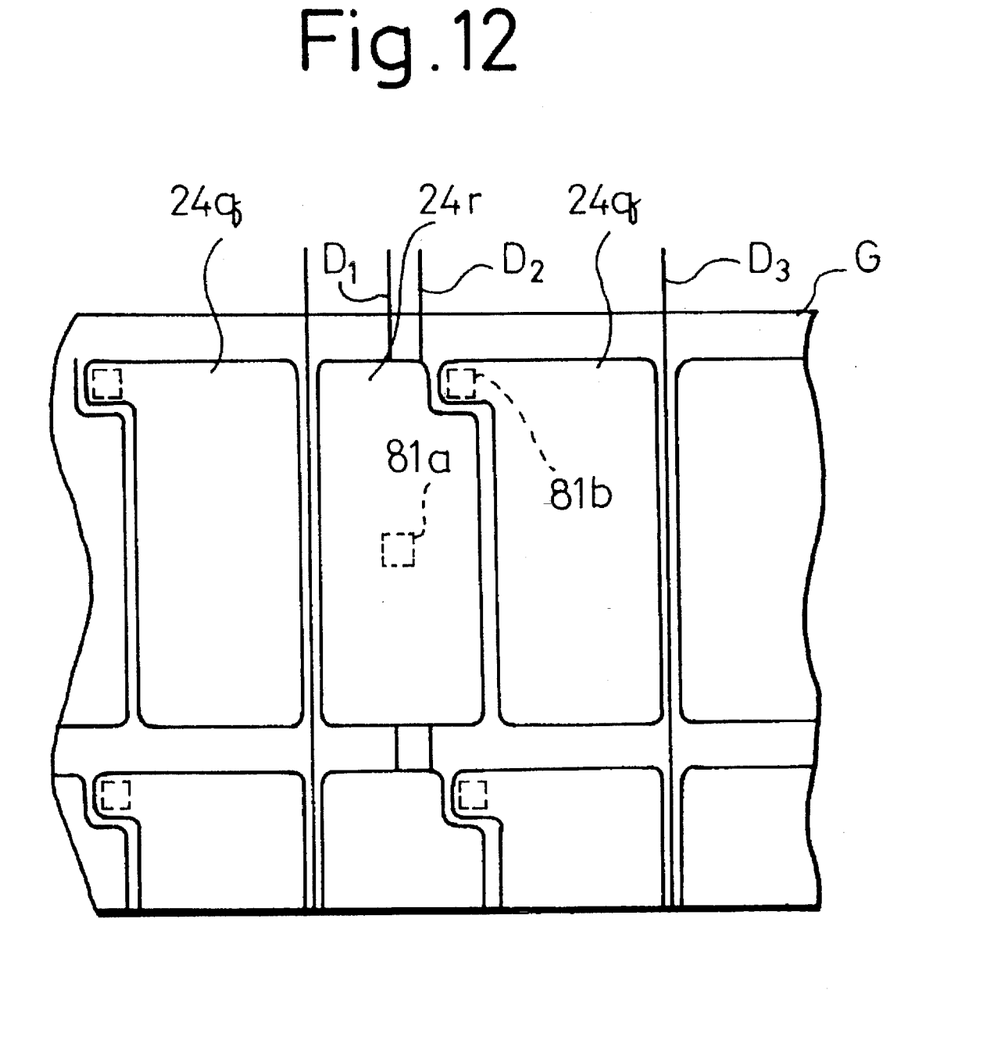
FIG. 12 is a plan view illustrating the intermediate electrodes of FIG. 11.
Figure 13:
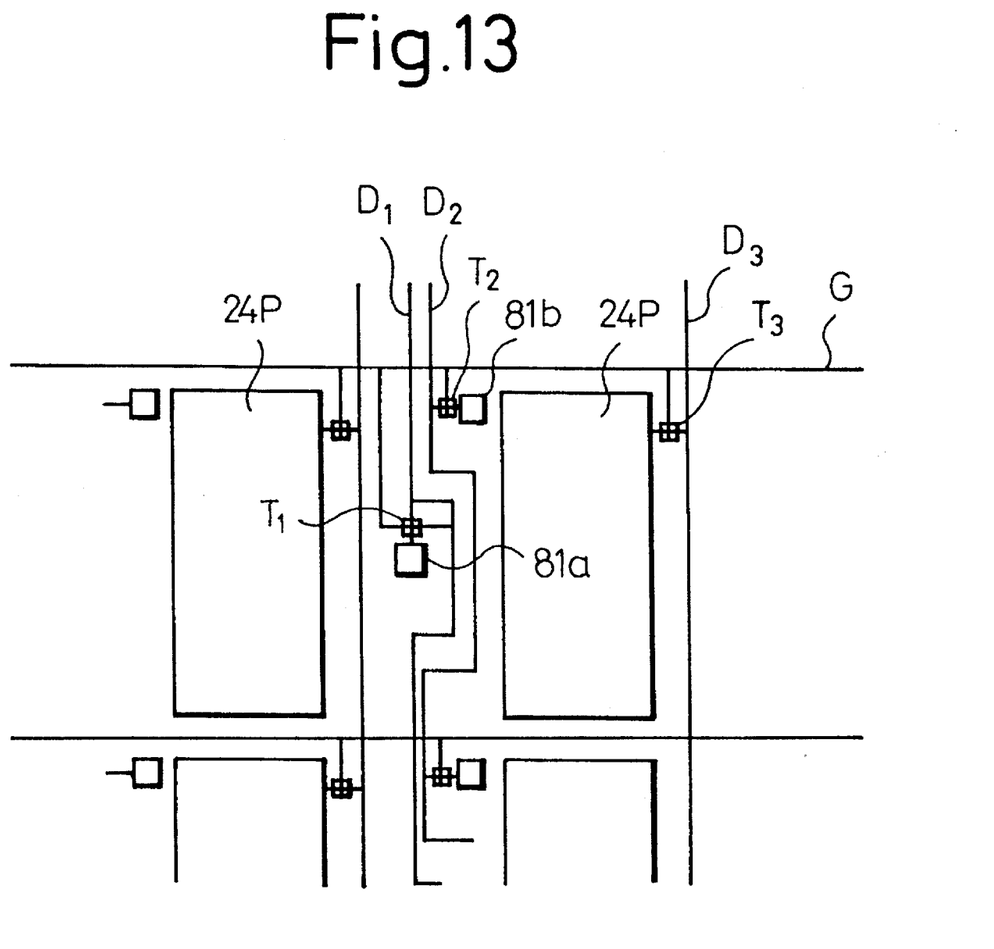
FIG. 13 is a plan view illustrating the lower electrodes of FIG. 11.

As shown in FIGS. 11 to 13, three electrodes 22, 24p and 24q are provided in parallel with and facing each other in a region corresponding to the second color region 16b. The first electrode of the three electrodes is the common electrode 22 arranged on the first plate 10, and the second electrode 24p of the three electrodes is the reflective electrode arranged on the second plate 12. The third intermediate electrode 24q of the three electrodes is arranged at a boundary between the first and second liquid crystal layers 18 and 20 and is transparent. The second and third electrodes 24p and 24q are pixel electrodes arranged for every second color region 16b. The second electrode 24p is connected to a data bus line $D_3$ arranged on the second plate 12 and the third electrode 24q is connected to a data bus line $D_2$ arranged on the second plate 12 by a connecting member 81b extending through the second liquid crystal layer 20.

Two electrodes 22 and 24r are provided in parallel with and facing each other in a region corresponding to the first color region 16a. The first electrode of the two electrodes is the common electrode arranged on the first plate 10 and the second electrode 24r of the two electrodes is a reflective electrode arranged at a boundary between the first and second liquid crystal layers 18 and 20. The second electrode 24r is a pixel electrode for the first color region 16a and is connected to a data bus line $D_1$ arranged on the second plate 12 by a connecting member 81a extending through the second liquid crystal layer 20. Therefore, in the color region 16a, only the first liquid crystal layer 18 is used.

FIG. 12 shows the intermediately located transparent electrode 24q and the reflective electrode 24r. FIG. 13 shows the reflective electrode 24p arranged on the second plate 12 (located under the transparent electrode 24q). In FIG. 13, there is no electrode at a position between two adjacent reflective electrodes 24p and under the reflective electrode 24r. The second plate 12 has an active matrix drive circuit, and the data bus lines $D_1$ and $D_2$ are arranged on the second plate 12 under the reflective electrode 24r. Another data bus line $D_3$ is arranged on the second plate 12 on the right side of each reflective electrode 24p. In addition, gate bus lines G are arranged on the second plate 12 for every row of electrodes.

The active matrix drive circuit includes thin film transistors (TFTs) $T_1$, $T_2$, and $T_3$ in addition to the bus lines. The transistor $T_l$ is connected to the data bus line $D_1$ and the gate bus line G, and to the intermediately located reflective electrode 24r via the connecting member 81a. The transistor $T_2$ is connected to the data bus line $D_2$ and the gate bus line G, and to the intermediately located transparent electrode 24q via the connecting member 81b. The transistor $T_3$ is connected to the data bus line $D_3$ and the gate bus line G, and to the reflective electrode 24p. The data bus lines $D_1$ and $D_2$ and the connecting member 81a are arranged under the reflective electrode 24r. In this arrangement, the intermediate reflective electrode 24r, the intermediate transparent electrode 24q, and the lower reflective electrode 24p, all being pixel electrodes, can have as wide a size as possible to thereby provide the largest aperture area. Therefore, it is possible to realize a high definition color liquid crystal display panel.

Figure 14A:
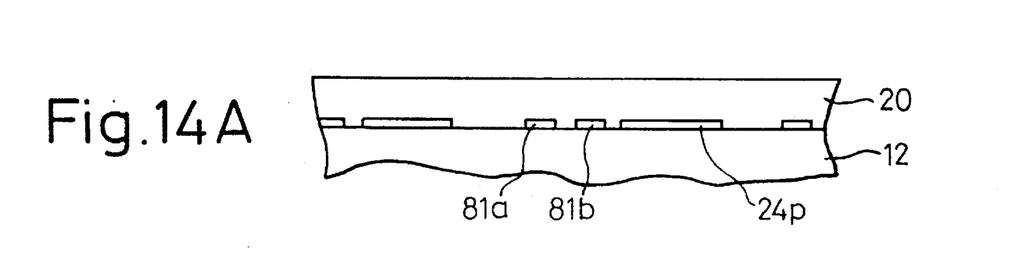
FIGS. 14A to 14D are views illustrating the manufacturing steps for manufacturing the liquid crystal display panel of FIG. 12.
Figure 14B:
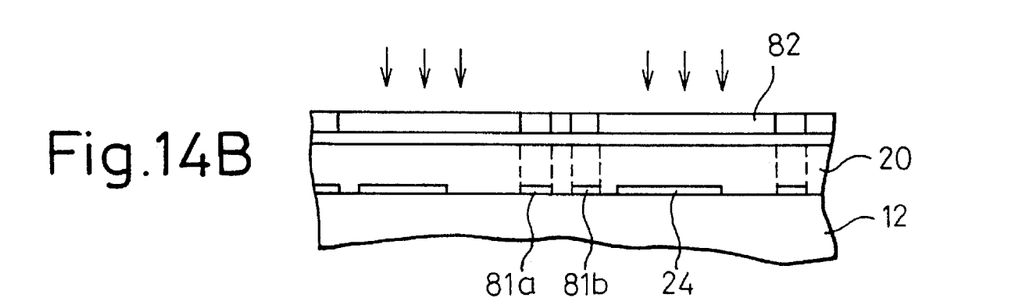
Figure 14C:
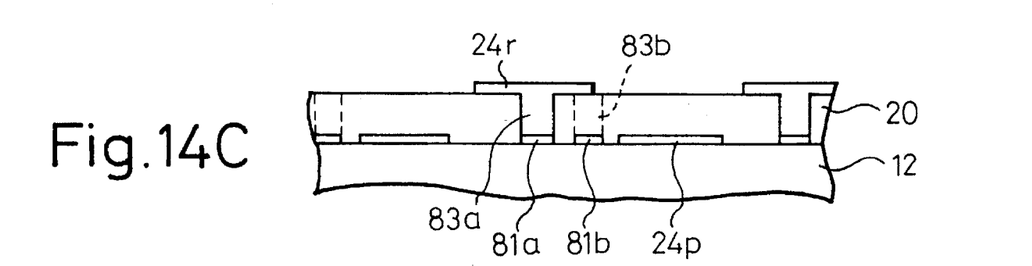
Figure 14D:
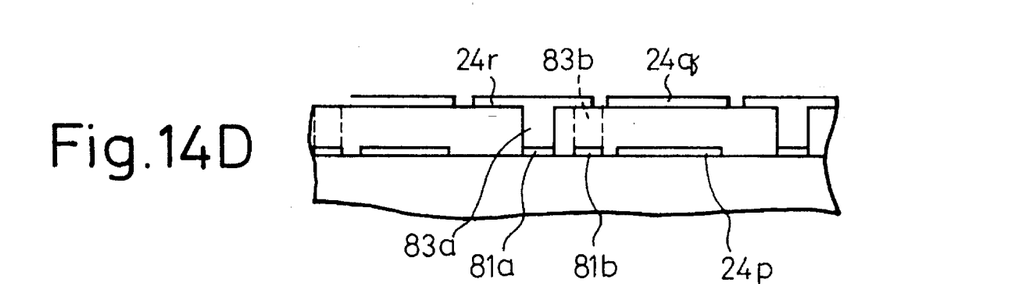

FIGS. 14A to 14D show the manufacturing steps for manufacturing the liquid crystal display panel of FIGS. 12 to 14. In FIG. 14A, a mixture including liquid crystal, a dichroic dye and an ultraviolet polymerizable prepolymer for forming the second liquid crystal layer 20 is applied to the second plate having the active matrix drive circuit formed thereon, by screen printing. The reflective electrodes 24p and the connecting members 81a and 81b are also formed on the second plate 12. In FIG. 14B, using a mask 82 having shading portions corresponding to the connecting members 81a and 81b, ultraviolet light is irradiated onto the mixture including liquid crystal, a dichroic dye and an ultraviolet polymerizable prepolymer for forming the second liquid crystal layer 20. The ultraviolet curable resin is then hardened, and the liquid crystal including dichroic dye is dispersed in the form of droplets to form the second liquid crystal layer 20. Portions of the second liquid crystal layer 20 that are covered by the mask 82 are not hardened, and holes are formed at these portions after the second liquid crystal layer 20 is cleaned in water. As shown in FIG. 14C, the holes are filled with connecting members 83a and 83b which become portions of the connecting members 81a and 81b and the intermediate reflective electrodes 24r are formed. The connecting member 83a connects the connecting member 81a to the intermediate reflective electrodes 24r. As shown in FIG. 14D, the intermediate transparent electrodes 24q are formed, the connecting member 83b connecting the connecting member 81b to the intermediate transparent electrodes 24q. Finally, the first plate 10 is adhered to the second plate 12, and the first liquid crystal layer 18 is formed on the second liquid crystal layer 20.

As explained above, according to the present invention, it is possible to obtain a liquid crystal display device in which the contrast is high and many colors can be realized.

We claim:

1. A liquid crystal display panel comprising:

a pair of opposing plates;

a liquid crystal layer arranged between the plates;

a color layer arranged on one of the plates and having a first color region and a second color region within one picture element;

the liquid crystal layer having a light transmission spectrum and comprising, in at least one of the first and second color regions, a first liquid crystal portion selectively controlling the transmission of light within a first bandwidth of the transmission spectrum, and a second liquid crystal portion selectively controlling the transmission of light within a second bandwidth, different from said first bandwidth, of the transmission spectrum;

the first and second liquid crystal portions being arranged in a substantially close relationship with each other between said pair of opposing plates.

2. A liquid crystal display panel according to claim 1, wherein said color layer comprises a selected one of a color filter and a reflecting film.

3. A liquid crystal display panel according to claim 1, wherein each liquid crystal portion of said liquid crystal layer can provide selective control of light transmission in accordance with simulating at least one of opacity corresponding to black, a particular color different from the color of the corresponding color layer and transparency, relatively to the light transmission.

4. A liquid crystal display panel according to claim 1, wherein:

said first liquid crystal portion comprises a liquid crystal including a first dichroic dye; and said second liquid crystal portion comprises a liquid crystal including a second dichroic dye different from the first dichroic dye.

5. A liquid crystal display panel according to claim 4, wherein:

said first liquid crystal portion has a first threshold voltage; and said second liquid crystal portion has a second threshold voltage different from the first threshold voltage.

6. A liquid crystal display panel according to claim 5, wherein at least one of said first and second liquid crystal portions comprises a selected one of a polymer dispersed type liquid crystal, a phase change type liquid crystal and a polymer liquid crystal.

7. A liquid crystal display panel according to claim 1, wherein said first and second liquid crystal portions respectively comprise first and second liquid crystal layers separately stratified, one above another between the pair of opposing plates and without an intermediate plate therebetween.

8. A liquid crystal display panel according to claim 7, comprising:

a set of three electrodes, comprising first, second and third electrodes, disposed in parallel relationship and facing each other in each region corresponding to at least a selected one of the first and second color regions, the first electrode of said set of three electrodes being arranged on one of said plates, the second electrode of said set of three electrodes being arranged on the other of said plates and the third electrode of said set of three electrodes being arranged at a boundary between said first and second liquid crystal layers and being transparent;

a first bus lines arranged on one of said plates;

a connecting member extending through one of said first and said second liquid crystal layers and connected to said third electrode of said set of three electrodes.

9. A liquid crystal display panel according to claim 8, wherein said set of three electrodes is provided only in each region corresponding to a selected one of the first and second color regions, further comprising:

a set of two electrodes comprising first and second electrodes, disposed in parallel relationship and facing each other in each region corresponding to the other of the first and second color regions, the first electrode of said set of two electrodes being arranged on one of said plates, the second electrode of said set of two electrodes being arranged at a boundary between said first and second liquid crystal layers and being reflective;

a second bus line arranged on said one of said plates on which said first bus line is arranged; and a connecting member extending through one of said first and second liquid crystal layers and connected to said second electrode of said set of two electrodes.

10. A liquid crystal display panel according to claim 9, wherein the first bus line and the second bus line are arranged on said one of said plates, below said second electrode of said set of two electrodes, relatively to said one of said plates.

11. A liquid crystal display panel according to claim 1, wherein the first and second color regions have the color combination of green and magenta, respectively, and the first and second liquid crystal portions have a selected one of the color combinations of blue and yellow respectively, and of red and cyan, respectively.

12. A liquid crystal display panel according to claim 1, wherein the first and second color regions have the color combination of blue and yellow, respectively, and the first and second liquid crystal portions have a selected one of the color combinations of red and cyan, respectively, and of green and magenta, respectively.

13. A liquid crystal display panel according to claim 1, wherein the first and second color regions have the color combination of red and cyan, respectively, and the first and second liquid crystal portions have a selected one of the color combinations of green and magenta, respectively, and of blue and yellow, respectively.

* * * * *

UNITED STATES PATENT AND TRADEMARK OFFICE
CERTIFICATE OF CORRECTION

PATENT NO. : 5,508,831
DATED : April 16, 1996
INVENTOR(S) : NAKAMURA et al.

It is certified that error appears in the above-indentified patent and that said Letters Patent is hereby corrected as shown below:

Col. 1, line 55, change "the second" to --each--.

Col. 2, line 18, change "within between" to --between--;
line 36, change "within between" to --between--.

Col. 11, line 18 (claim 8, line 14), change "lines" to --line,--.

Signed and Sealed this

Seventeenth Day of September, 1996

Attest:

BRUCE LEHMAN

Attesting Officer     Commissioner of Patents and Trademarks